United States Patent
Li et al.

(10) Patent No.: US 11,936,884 B2
(45) Date of Patent: *Mar. 19, 2024

(54) CODED-BLOCK-FLAG CODING AND DERIVATION

(71) Applicant: Microsoft Technology Licensing, LLC, Redmond, WA (US)

(72) Inventors: Bin Li, Beijing (CN); Jizheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,623

(22) Filed: Nov. 8, 2022

(65) Prior Publication Data
US 2023/0056351 A1     Feb. 23, 2023

Related U.S. Application Data

(63) Continuation of application No. 17/465,601, filed on Sep. 2, 2021, now Pat. No. 11,523,124, which is a continuation of application No. 16/919,481, filed on Jul. 2, 2020, now Pat. No. 11,140,401, which is a continuation of application No. 16/292,019, filed on Mar. 4, 2019, now Pat. No. 10,735,749, which is a continuation of application No. 15/646,361, filed on
(Continued)

(51) Int. Cl.
*H04N 19/18*     (2014.01)
*H04N 19/132*     (2014.01)
*H04N 19/463*     (2014.01)
*H04N 19/96*     (2014.01)

(52) U.S. Cl.
CPC ........... *H04N 19/18* (2014.11); *H04N 19/132* (2014.11); *H04N 19/463* (2014.11); *H04N 19/96* (2014.11)

(58) Field of Classification Search
CPC .... H04N 19/18; H04N 19/132; H04N 19/463; H04N 19/96
See application file for complete search history.

(56) References Cited

U.S. PATENT DOCUMENTS

| | | | | |
|---|---|---|---|---|
| 2012/0106649 A1* | 5/2012 | Wang | ................... | H04N 19/186 375/240.18 |
| 2013/0195199 A1* | 8/2013 | Guo | ....................... | H04N 19/91 375/240.18 |

(Continued)

FOREIGN PATENT DOCUMENTS

| | | | | |
|---|---|---|---|---|
| CN | 107071487 B | * | 9/2020 | ........... H04N 19/159 |
| WO | WO-2013107027 A1 | * | 7/2013 | ........... H04N 19/132 |

*Primary Examiner* — Tracy Y. Li
(74) *Attorney, Agent, or Firm* — Klarquist Sparkman, LLP

(57) ABSTRACT

Techniques for coding and deriving (e.g., determining) one or more coded-block-flags associated with video content are described herein. A coded-block-flag of a last node may be determined when coded-block-flags of preceding nodes are determined to be a particular value and when a predetermined condition is satisfied. In some instances, the predetermined condition may be satisfied when $\log_2$(size of current transform unit) is less than $\log_2$(size of maximum transform unit) or $\log_2$(size of current coding unit) is less than or equal to $\log_2$(size of maximum transform unit)+1. The preceding nodes may be nodes that precede the last node on a particular level in a residual tree.

20 Claims, 5 Drawing Sheets

Related U.S. Application Data

Jul. 11, 2017, now Pat. No. 10,264,271, which is a continuation of application No. 13/530,849, filed on Jun. 22, 2012, now Pat. No. 9,749,645.

(56) References Cited

U.S. PATENT DOCUMENTS

| 2013/0266074 A1* | 10/2013 | Guo | H04N 19/96 |
| | | | 375/240.24 |
| 2014/0219337 A1* | 8/2014 | Lee | H04N 19/176 |
| | | | 375/240.02 |
| 2014/0286396 A1* | 9/2014 | Lee | H04N 19/70 |
| | | | 375/240.02 |

* cited by examiner

CODED-BLOCK-FLAG CODING AND DERIVATION

CROSS REFERENCE TO RELATED APPLICATIONS

This application is a continuation of U.S. patent application Ser. No. 17/465,601, filed Sep. 2, 2021, which is a continuation of U.S. patent application Ser. No. 16/919,481, filed Jul. 2, 2020, now U.S. Pat. No. 11,140,401, which is a continuation of U.S. patent application Ser. No. 16/292,019, filed Mar. 4, 2019, now U.S. Pat. No. 10,735,749, which is a continuation of U.S. patent application Ser. No. 15/646,361, filed Jul. 11, 2017, now U.S. Pat. No. 10,264,271, which is a continuation of U.S. patent application Ser. No. 13/530,849, filed Jun. 22, 2012, now U.S. Pat. No. 9,749,645, the disclosure of which is hereby incorporated by reference.

BACKGROUND

The delivery of video content generally offers a rich user experience. To promote efficient delivery, the video content is typically encoded prior to delivery to reduce the amount of data transferred over the network. One common type of video compression is a motion-compensation-based video coding scheme, which is used in such coding standards as MPEG-1, MPEG-2, MPEG-4, H.261, H.263, and H.264/AVC. In such coding standards, video images are sampled and transformed into coefficients that capture the variation in pixels across the image. The coefficients are then quantized and transmitted to a decoder. The decoder is able to decode the image by performing operations that are substantially the inverse of the encoding operation.

SUMMARY

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

This disclosure is directed to coding and deriving (e.g., determining) one or more coded-block-flags (CBFs) associated with video content. In particular, an encoder or decoder may represent video content with a plurality of nodes (e.g., in a residual quadtree structure). The plurality of nodes may include a plurality of transform units that are each associated with a CBF. A CBF may indicate whether or not the transform unit includes residual information (e.g., information generated through prediction). For example, a CBF value of "0" may indicate that the transform unit does not include residual information and a CBF value of "1" may indicate that the transform unit includes residual information.

The encoder or decoder may determine a CBF value(s) of a preceding transform unit(s) (e.g., first three transform units) at a particular level. The encoder or decoder may also determine whether a predetermined condition is satisfied. For example, the encoder or decoder may determine whether $\log_2$(a size of a current transform unit)<$\log_2$(a predetermined maximum transform unit size) and/or whether $\log_2$(a size of a current coding unit)≤$\log_2$(the predetermined maximum transform unit size)+1.

If the value(s) of the preceding transform unit(s) at the particular level indicates that the transform unit(s) does not include residual information and if the predetermined condition is satisfied, then the encoder or decoder may determine (e.g., infer) the CBF value of a last transform unit (e.g., fourth transform unit) at the particular level. For example, the encoder or decoder may determine that the last CBF value indicates that the last transform unit includes residual information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
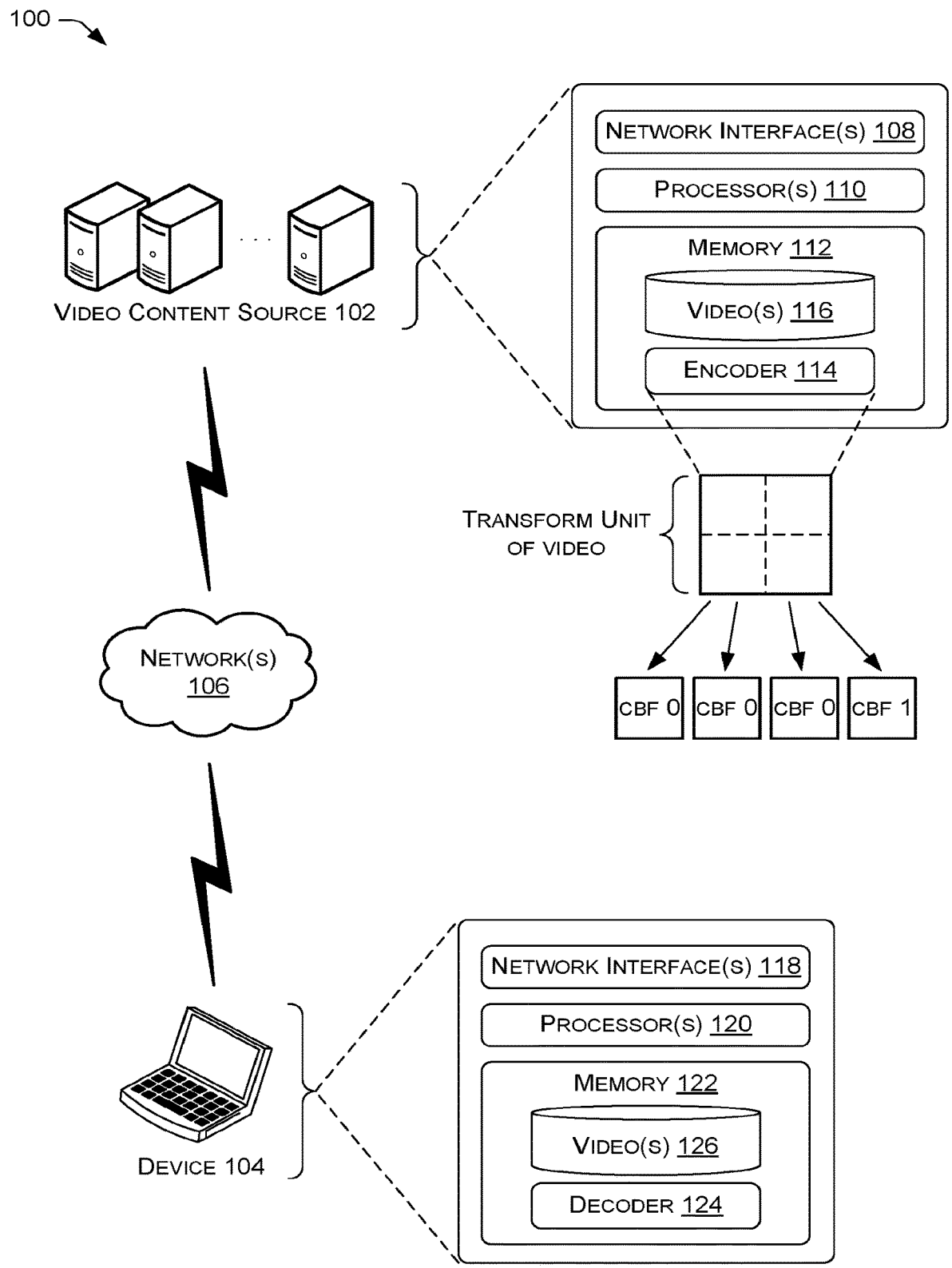
FIG. 1 illustrates an example architecture to determine whether a coded-block-flag value of a last node of a particular level should be coded and/or may be derived.

Video content is generally defined by a series of frames that are associated with a particular order. These frames often include duplicative information in a single frame or across multiple frames. In order to reduce an amount of duplicative information that is stored or transferred, an encoder may perform various coding (e.g., compression) techniques that decrease a number of bits used to represent the video content.

This disclosure is directed to coding and deriving (e.g., inferring) one or more coded-block-flags (CBFs) associated with video content. In some instances, by coding and/or deriving a CBF as described herein, video content may be represented with fewer bits in comparison to previous techniques.

In some embodiments, an encoder or decoder may represent video content with a plurality of nodes. For example, the video content may be represented in a residual tree structure (e.g., residual quadtree). The residual tree structure may include a plurality of transform units that are each associated with CBF. A CBF may indicate whether or not the transform unit includes residual information (e.g., information generated through prediction).

The encoder or decoder may determine CBF values of preceding transform units (e.g., first three transform units) at a particular level. The encoder or decoder may also determine whether a predetermined condition is satisfied. For example, the encoder or decoder may determine whether $\log_2$(a size of a current transform unit)<$\log_2$(a predetermined maximum transform unit size) and/or whether $\log_2$(a size of a current coding unit)≤$\log_2$(the predetermined maximum transform unit size)+1.

If the values of the preceding transform units at a particular level indicate that the transform units do not include residual information and if the predetermined condition is satisfied, then the encoder or decoder may determine (e.g., infer) the CBF value of a last transform unit (e.g., fourth transform unit). For example, the encoder or decoder may determine that the last CBF value indicates that the last transform unit includes residual information.

The CBF coding and deriving techniques are described herein in the context of the High Efficiency Video Coding (HEVC) standard. However, these techniques may be implemented in other coding standards.

In some instances, the techniques described herein may allow an encoder and/or decoder to determine a value of a CBF of a particular node (e.g., transform unit) in more cases in comparison to previous techniques. For example, a CBF value of a last transform unit may be determined when three consecutive CBFs of a particular value (e.g., "0") are identified for preceding transform units and when (i) $\log_2$ (size of current transform unit) is less than $\log_2$(size of maximum transform unit) or (ii) $\log_2$(size of current coding unit) is less than or equal to $\log_2$(size of maximum transform unit)+1. This determination may allow an encoder to refrain from sending the CBF of the last transform unit to a decoder. Thus, in some instances, bits used to represent video content may be reduced (e.g., in comparison to previous techniques) and video content may be further compressed.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Illustrative Architecture

In the High Efficiency Video Coding (HEVC) standard (sometimes referred to as H.265/MPEG-H), a frame of video content is divided into non-overlapping coding units (CU). Each coding unit may correspond to a block of pixels having predetermined dimensions (e.g., an 8×8, 16×16, 32×32, 64×64, etc.), which may be established by the HEVC standard.

A coding unit may be split (e.g., divided) into sub-units that each corresponds to a block of pixels (e.g., a 4×4, 8×8, etc.). Each sub-unit may be split into further sub-units. This process of splitting may continue for any number of levels. In some instances, a coding unit is split at each level into four sub-units forming a quadtree structure.

A coding unit or sub-unit may be split based on requirements that are established by an encoder, decoder, application, and/or individual. For example, the encoder may perform a cost analysis to determine whether or not it would be beneficial to split a coding unit. To illustrate, an encoder may determine that a cost of rate distortion is greater for a non-split coding unit in comparison to a cost of rate distortion for a split coding unit. Based on this determination, the encoder may split the coding unit. Other reasons for splitting a coding unit are generally known and include, for example, complexity, rate control, location of residue, etc.

An encoder may perform various operations on a coding unit that is not split (e.g., coding unit at a lowest level) to generate a bitstream. Generally, the encoder may perform prediction, transformation, and/or quantization operations on a non-split coding unit. The coding unit may be represented as different types of units at each operation, such as one or more prediction units (PU) or transform units (TU), as discussed in further detail below.

At prediction, a non-split coding unit (e.g., coding unit at a lowest level) is represented as one or more prediction units. A prediction unit may be split into sub-units which may in turn be split into further sub-units. A prediction unit that is not split may be used to determine a reference block(s) and/or other information for reconstructing a block. The reference block(s) and/or information may be determined through intra-prediction (e.g., spatial prediction) and/or inter-prediction (e.g., temporal prediction). The reference block(s) may correspond to one or more blocks of pixels that best matches the prediction unit. In intra-prediction, the reference block corresponds to a block in a same slice (e.g., frame) as the prediction unit (e.g., surrounding pixels are used). In inter-prediction, the reference block corresponds to a block in a temporally neighboring picture (e.g., frame).

In some instances, information for reconstructing the current block may include residual information. When the reference block does not exactly match a prediction unit, an encoder determines a difference between pixel values of the reference block and pixel values of the prediction unit. This difference is referred to as "residual information" (also known as "residue" or "residual values"). The information for reconstructing the current block may also include a motion vector, information identifying a reference frame associated with a reference block, and so on.

At transformation, a non-split coding unit (e.g., coding unit at a lowest level) is represented as one or more transform units. A transform unit may be split into sub-units which may in turn be split into further sub-units. In some instances, the transform unit corresponds to a prediction unit, while in other instances the transform unit is larger or smaller than a prediction unit. Further, in some instances each time a transform unit is split, the transform unit is split into four sub-units forming a residual quadtree (RQT).

A residual quadtree may be used to represent residual information associated with one or more transform units. If a transform unit has no residual information (e.g., does not have any non-zero coefficients), then the transform unit is not split into sub-units. The transform unit at the highest level may be referred to as the "root" transform unit which may correspond to the coding unit. The transform units at the lowest level (e.g., level at which transform units are not split) may be referred to as "leaf" transform units. Further, a transform unit off of which another transform unit was split may be referred to as a "parent" transform unit for the other transform unit.

A transform unit that is not split may be used to determine (e.g., generate) a block of coefficients. For example, residual information associated with a prediction unit, and corresponding transform unit, may be transformed to generate a block of coefficients. The transform may include performing generally known transform techniques, such as a Discrete Cosine Transform (DCT). If, for example, there is no residual information, then each of the coefficients may be zero.

At quantization, each coefficient of a block of coefficients is quantized. The quantized coefficients may be stored in a bitstream, along with prediction information (e.g., prediction mode, coded-block-flag, motion vector, etc.) and/or transform information (e.g., transform mode, etc.).

In some instances, a coded-block-flag (CBF) is used to indicate whether or not residual information exists for a prediction unit and/or corresponding transform unit. For example, a CBF of "1" may indicate that a transform unit includes residual information (e.g., transform unit includes non-zero coefficients). Meanwhile, a CBF of "0" may indicate that a transform unit does not include non-zero coefficients (e.g., transform unit has coefficients of zero).

In order to store residual information for a particular coding unit, an encoder may use a residual quadtree structure. First, the encoder stores a CBF for a root transform unit of the residual quadtree. If the CBF for the root transform unit is "0", then no coefficients are stored for the root transform unit (e.g., the coefficients are zero). If the CBF for the root transform unit is "1", then the encoder proceeds to the next lowest level and identifies values of CBFs on that level.

As noted above, in a residual quadtree a transform unit is not split into sub-units when the transform unit does not have any non-zero coefficients (e.g., CBF is "0"). As such, if, for example, the encoder identifies three consecutive CBFs of "0" while storing the CBFs for transform units of a same level of the residual quadtree (e.g., first three transform units), then the encoder may infer that the CBF is "1" for a last transform unit on that level (e.g., fourth transform unit), otherwise the CBF for the parent transform unit would be "0" and the CBF would have been signaled at the parent transform unit. Accordingly, in such instances the encoder may not store the last CBF (e.g., "1") based on this inference.

In one exception, the encoder does not infer that the last CBF is "1" when a transform unit is larger than a predetermined maximum transform unit size (e.g., 32×32). Here, the transform unit may have been required to split (e.g., because it is larger than the predetermined maximum size). This may cause a transform unit that has coefficients of zero (e.g., CBF is "0") to be split. Thus, in order to avoid an incorrect inference of "1" for a last CBF that is actually "0" and that was required to split, the encoder does not infer that the last CBF is "1" if a size of the transform unit is greater than or equal to the predetermined maximum transform unit size. However, this exception is restricting and often avoids inferences which are accurate.

This disclosure is directed to coding and deriving (e.g., inferring) one or more CBFs associated with video content. For example, a CBF of a last transform unit of a particular level of a residual quadtree may be inferred to be "1" when three consecutive CBFs of "0" are identified for preceding transform units on the particular level and when (i) $\log_2$(size of current transform unit) is less than $\log_2$(size of maximum transform unit) or (ii) $\log_2$(size of current coding unit) is less than or equal to $\log_2$(size of maximum transform unit)+1.

FIG. 1 illustrates an example architecture 100 in which techniques described herein may be implemented. Here, the techniques are described in the context of a video content source 102 that encodes (e.g., compresses) video content and sends the encoded video content to a device 104. The video content source 102 communicates with the device 104 over a network(s) 106.

The video content source 102 and/or the device 104 may be implemented by any of a variety of conventional computing devices, such as a server, a laptop computer, a desktop computer, a smart phone, an electronic reader device, a mobile handset, a personal digital assistant (PDA), a portable navigation device, a portable gaming device, a tablet computer, a watch, a portable media player, and the like. In one example, the video content source 102 and/or the device 104 is configured in a cluster, data center, cloud computing environment, or a combination thereof.

The video content source 102 is equipped with one or more network interfaces 108, one or more processors 110, and memory 112. The memory 112 may be configured to store one or more software and/or firmware modules, which are executable on the one or more processors 110 to implement various functions. For example, the memory 112 may include an encoder 114 (e.g., encoder module) configured to encode video content 116. Although not illustrated in FIG. 1, the memory 112 may also include a decoder configured to decode video content.

The encoder 114 may generate a bitstream of the video content that may be stored and/or sent to a decoder. In particular, the encoder may represent residual information in a residual quadtree structure, infer a value of a particular CBF (e.g., CBF of a last transform unit) when consecutive CBFs (e.g., CBFs of three preceding transform units) of a particular value are identified and when a predetermined condition is satisfied, and/or refrain from storing the particular CBF in the bitstream.

Meanwhile, the device 104 is equipped with one or more network interfaces 118, one or more processors 120, and memory 122. The memory 122 may be configured to store one or more software and/or firmware modules, which are executable on the one or more processors 120 to implement various functions. For example, the memory 122 may include a decoder 124 (e.g., decoder module) configured to decode video content 126. The video content 126 may have been received from the video content source 102 or may have been received from a different source. Although not illustrated in FIG. 1, the memory 122 may also include an encoder configured to encode video content.

The decoder 124 may receive a bitstream from an encoder or other source and decode the bitstream to form video content. In particular, the decoder may generally infer (e.g., derive) a value of a particular CBF (e.g., CBF of a last transform unit) when consecutive CBFs (e.g., CBFs of three preceding transform units) of a particular value are identified and when a predetermined condition is satisfied.

Although the encoder 114 and decoder 124 are illustrated in FIG. 1 as being implemented as modules, the encoder 114 and/or decoder 124 may be implemented as one or more microprocessors, digital signal processors, application specific integrated circuits (ASICs), field programmable gate arrays (FPGAs), discrete logic, or any combinations thereof. In some instances, the encoder 114 and/or decoder 124 may be integrated with an audio encoder/decoder and include appropriate MUX-DEMUX units, or other hardware and software, to handle encoding/decoding of both audio and video in a common data stream or separate data streams. In addition, in some instances the encoder 114 and/or decoder 124 may be constructed as part of a processor or incorporated into an operating system or other application. Further, the encoder 114 and/or decoder 124 may operate according to a video compression standard, such as MPEG-1, MPEG-2, MPEG-4, H.261, H.263, H.264/AVC, and HEVC.

Further, although the memory 112 and 122 is depicted in FIG. 1 as a single unit, the memory 112 and/or 122 (and all other memory described herein) may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

As noted above, the video content source 102 and the device 104 may communicate via the network(s) 106. The network(s) 106 may include any one or combination of multiple different types of networks, such as cellular networks, wireless networks, Local Area Networks (LANs), Wide Area Networks (WANs), and the Internet.

Illustrative Residual Quadtree

Figure 2A:
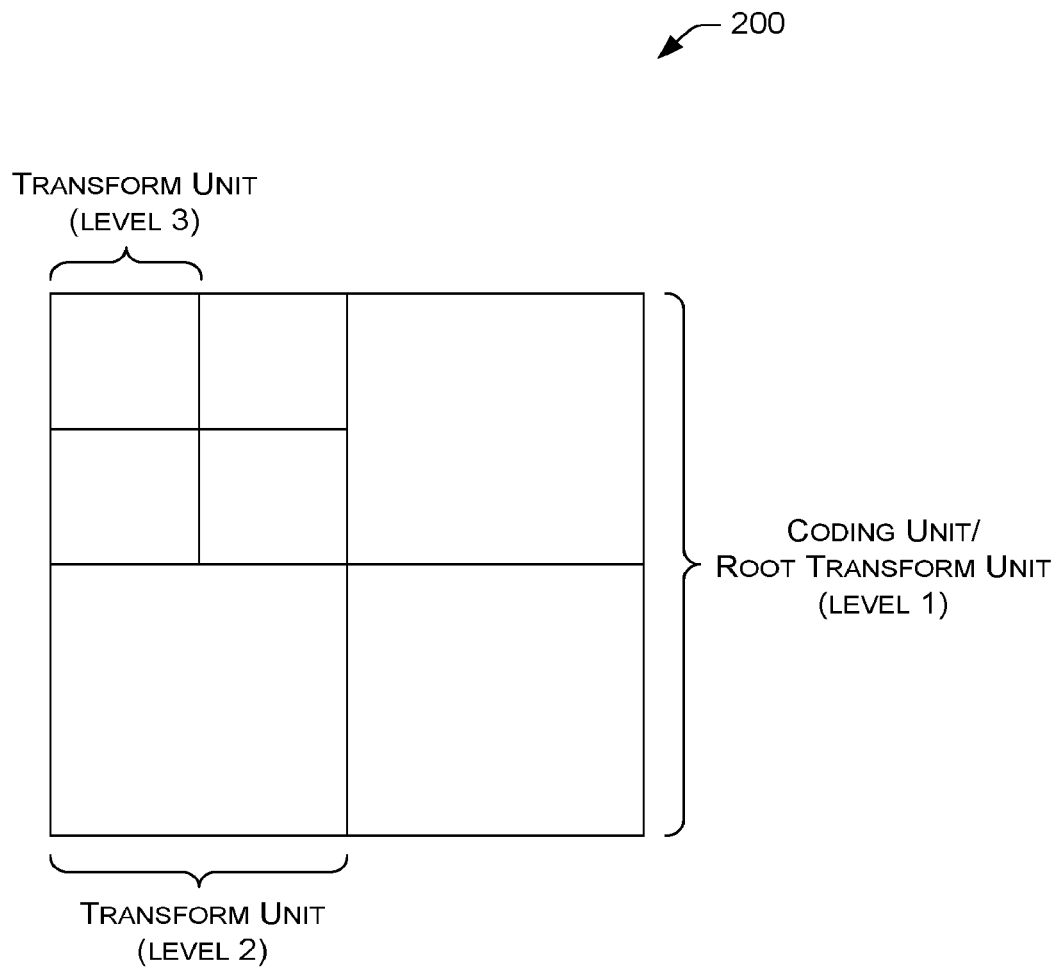
FIGS. 2A-2B illustrate an example residual quadtree which may be used to represent residual information.
Figure 2B:
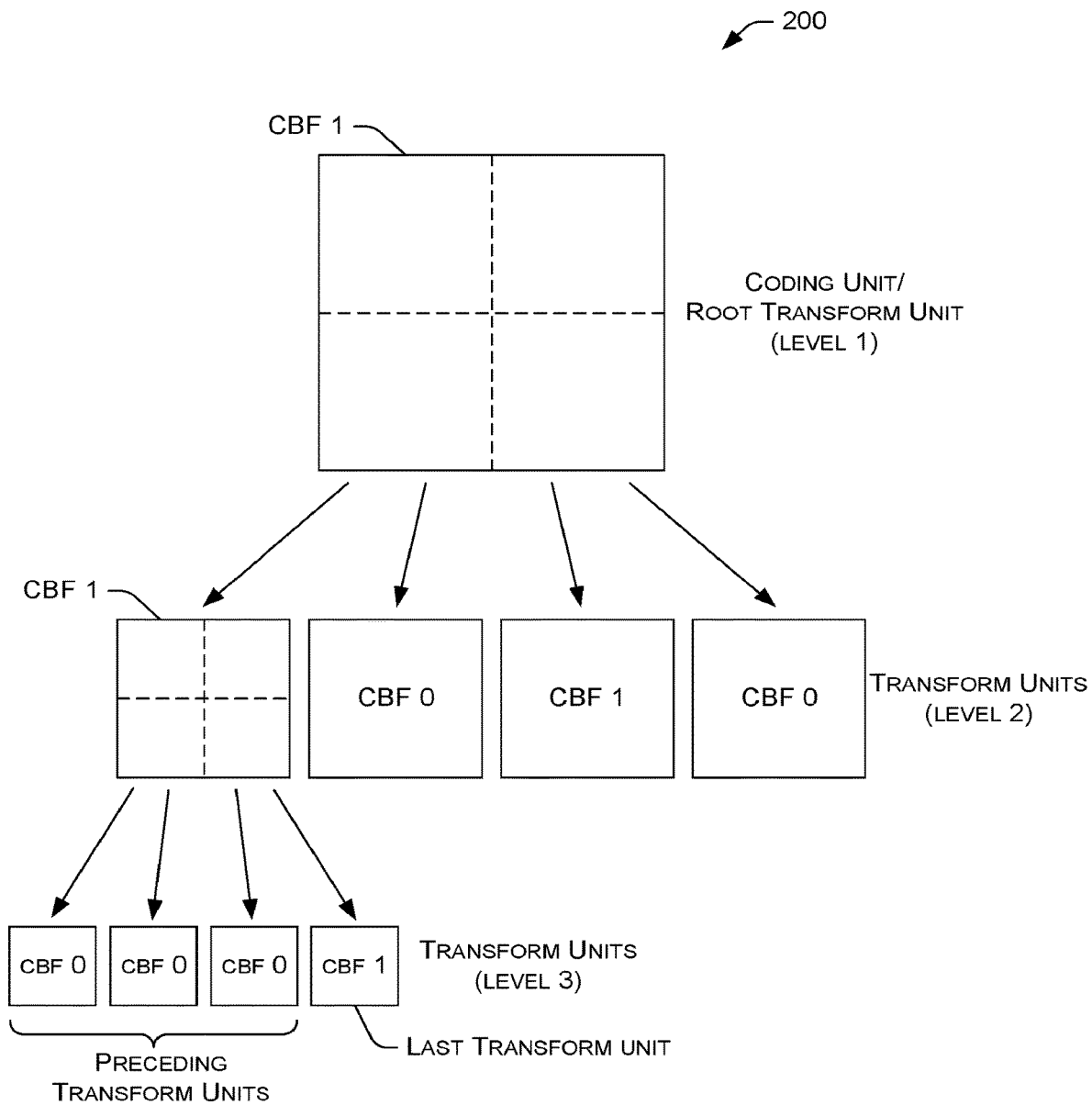

FIGS. 2A-2B illustrate an example residual quadtree (RQT) 200 which may be used to represent residual information. In FIG. 2A, a coding unit (CU) is represented by a root transform unit (TU) at level 1. In this example, the root transform unit is split (e.g., divided) into four sub-units (e.g., transform units at level 2). Further, the transform unit in the upper-left corner of the coding unit at level 2 is split into four further sub-units (e.g., transform units at level 3).

FIG. 2B illustrates the residual quadtree 200 of FIG. 2A with transform units separated at each of the levels 1-3. Here, each transform unit is illustrated with a CBF value indicating whether or not residual information exists for the transform unit. In this example, a CBF value of "1" indicates that a transform unit includes residual information (e.g., transform unit includes non-zero coefficients) and a CBF value of "0" indicates that a transform unit does not include non-zero coefficients (e.g., transform unit has coefficients of zero). However, it should be appreciated that other values may be used to indicate whether or not residual information exists for a transform unit. The residual quadtree 200 may be used to code or decode the coding unit.

In some instances, one or more split flags are coded along with CBFs of the residual quadtree. A split flag may be used to indicate whether or not a transform unit is split. For example, a split flag of "1" indicates that a transform unit is split and a split flag of "0" indicates that the transform unit is not split. As such, in FIG. 2B, the root transform unit would include a split flag of "1", the first sub-transform unit on level 2 on the left would include a split flag of "1", the next three sub-transform units on level 2 would include split flags of "0", and the four sub-transform units on level 3 would include split flags of "0".

In coding a transform unit (e.g., current transform unit), an encoder may initially store a split flag for the transform unit, beginning at the root transform unit. If the split flag is "1", the encoder may store the split flag and proceed to the next lowest level (e.g., store information for transform units below the level of the current transform unit and possibly proceed to an even lower level). When the encoder finds a split flag of "0", the encoder may store the split flag and proceed to store information for the current transform unit including information associated with the residual for the current transform unit (e.g., CBF and/or residual information).

In storing information associated with the residual, the encoder first identifies a value of the CBF. If the CBF is "0" indicating that there is no residual information (e.g., coefficients are zero), then the encoder may store the CBF and refrain from storing the coefficients associated with the residual information since the coefficients are zero. Alternatively, if the CBF is "1" indicating that there is residual information, then the encoder may store the CBF and store the coefficients.

To illustrate, in FIG. 2B an encoder would store (e.g., in a bitstream) a split flag of "1" for the root transform unit, store a split flag of "1" for the first transform unit of level 2 (e.g., transform unit on left), store a split flag of "0" for the first transform unit of level 3 (e.g., transform unit on left), store a CBF of "0" for the first transform unit of level 3, store a split flag of "0" for the second transform unit of level 3, store a CBF of "0 for the second transform unit of level 3, store a split flag of "0" for the third transform unit of level 3, store a CBF of "0" for the third transform unit of level 3, store a split flag of "0" for the fourth transform unit of level 3, store a CBF of "1" for the fourth transform unit of level 3, and store the coefficients of the fourth transform unit. As discussed in further detail below, in some instances the CBF of the fourth transform unit (e.g., last transform unit) may not be stored. After storing CBFs for level 3, the encoder may return to level 2 and store CBFs and/or coefficients for the remaining three transform units on level 2.

As noted above, in aspects of the current disclosure a CBF of a last transform unit (e.g., the fourth transform unit on level 3) may be coded and derived when three consecutive CBFs of "0" are identified for preceding transform units on a particular level and when (i) $\log_2$(size of current transform unit) is less than $\log_2$(size of maximum transform unit) or (ii) $\log_2$(size of current coding unit) is less than or equal to $\log_2$(size of maximum transform unit). A maximum transform unit size may be any size (e.g., 16×16, 32×32, 64×64) that is configured by an encoder, decoder, individual, and/or application. In one instance, the maximum size is set to a 32×32 pixel block.

In deriving this condition, three cases will be discussed in further detail below: 1) a size of a current transform unit is less than a maximum size of a transform unit (e.g., predetermined maximum size), 2) a size of a current transform unit is greater than a maximum size of a transform unit, and 3) a size of a current transform unit is equal to a maximum size of a transform unit.

Case 1: When a size of a current transform unit is less than a maximum size of a transform unit, an encoder may infer a CBF value of a last transform unit when three consecutive CBFs are identified that indicate that residual information does not exist. In this case, the current transform unit is not required to split into sub-units.

Case 2: When a size of a current transform unit is greater than a maximum size of a transform unit, an encoder may not signal (e.g., infer and/or store) a CBF for the current transform unit. In this case, the current transform unit was required to split into sub-units and the CBF may not be signaled at the level of current transform unit. Here, the CBF may be signaled for the leaf transform units one or more levels below the current transform unit (e.g., CBF is signaled for un-split leaf transform units). Accordingly, the inference techniques may not be implemented for a CBF of a current transform unit that is a last transform unit since the CBF will not be signaled at a level of the current transform unit.

Case 3: When a size of a current transform unit is equal to a maximum size of a transform unit, an encoder may signal the CBF for the current transform unit if the current transform unit is a leaf transform unit. Generally, in this case the inference techniques may not be implemented for a last CBF because the current transform unit may be have been required to split into sub-units. However, if the CBF of a parent transform unit is signaled as "1" (the CBF of a root transform unit is signaled as root CBF), the inference techniques may be implemented for a last CBF. Accordingly, in this case if $\log_2$(a size of current transform unit)+1 is equal to $\log_2$(a size of a parent transform unit) and the CBF of the parent transform unit is signaled, then the inference techniques may be implemented for a last CBF.

Generally, the CBF of a parent transform unit is sent if it is the root of the transform unit (e.g., root of residual quadtree), and the root transform unit has a same size as a current coding unit. Thus, the condition for case 3 may be changed to: $\log_2$(a size of current transform unit)+1=$\log_2$(a size of current coding unit). This condition can be relax to: $\log_2$(a size of current transform unit)+1=$\log_2$(a size of current coding unit)|| $\log_2$(a size of current transform unit)+1>$\log_2$(a size of current coding unit). Because $\log_2$(a size of current transform unit)+1 is rarely (e.g., never) greater than $\log_2$(a size of current coding unit), the condition for case 3 may be further changed to: $\log_2$(a size of current coding unit)<=$\log_2$(a size of current transform unit)+1. Since a size of the current transform unit can be assumed to be a size of the maximum transform unit, the condition becomes: $\log_2$(a size of current coding unit)<=$\log_2$(maximum transform unit)+1.

By combining the results of Cases 1 and 3, a CBF value may be inferred when three consecutive CBFs of "0" are identified for preceding transform units on a particular level and when (i) $\log_2$(size of current transform unit) is less than $\log_2$(size of maximum transform unit) and/or (ii) $\log_2$(size of current coding unit) is less than or equal to $\log_2$(size of maximum transform unit)+1.

To illustrate, in FIG. 2B an encoder may infer a CBF value of "1" for the last transform unit (e.g., fourth transform unit) on level 3 if (i) $\log_2$(size of last transform unit) is less than $\log_2$(size of maximum transform unit) or (ii) $\log_2$(size of the coding unit) is less than or equal to $\log_2$(size of maximum transform unit)+1, since the CBF values of preceding transform units on level 3 are "0". After inferring the CBF value of "1", the encoder may refrain from storing the CBF in the bitstream. In addition, the encoder may store the coefficients for the last transform unit since there is residual information (e.g., the coefficients are non-zero).

In some instances, a CBF value is stored for each leaf transform unit and for each non-leaf transform unit that is required to be split. This may occur regardless of whether the CBF value is associated with a chroma component or a luma component of the transform unit. A chroma component corresponds to a signal for representing color information and luma component corresponds to a signal for representing brightness information. These components are generally known by those of ordinary skill in the art. As noted above, a leaf transform unit is a transform unit at the lowest level (e.g., level at which a transform unit is not split). By storing CBF values of non-leaf transform units that are required to be split, CBF signaling (e.g., storing and/or sending CBFs to a decoder) may be more efficient in comparison to techniques which send CBF values only for leaf transform units. In some instances, this may be more efficient for a case in which most of the residual information is zero and a transform unit is required to split for some other reason. In such a case, all the CBFs of all the transform units below a current non-leaf transform unit do not need to be signaled, because the CBF of the non-leaf transform unit would be signaled as "0". In one example, a transform unit, of a particular quadtree shared by chroma and luma components, may have most of the chroma residue as "0," and the transform unit may be split because of the luma component. In such a case, signaling a CBF for non-leaf transform units may be more efficient.

Example Processes

Figure 3:
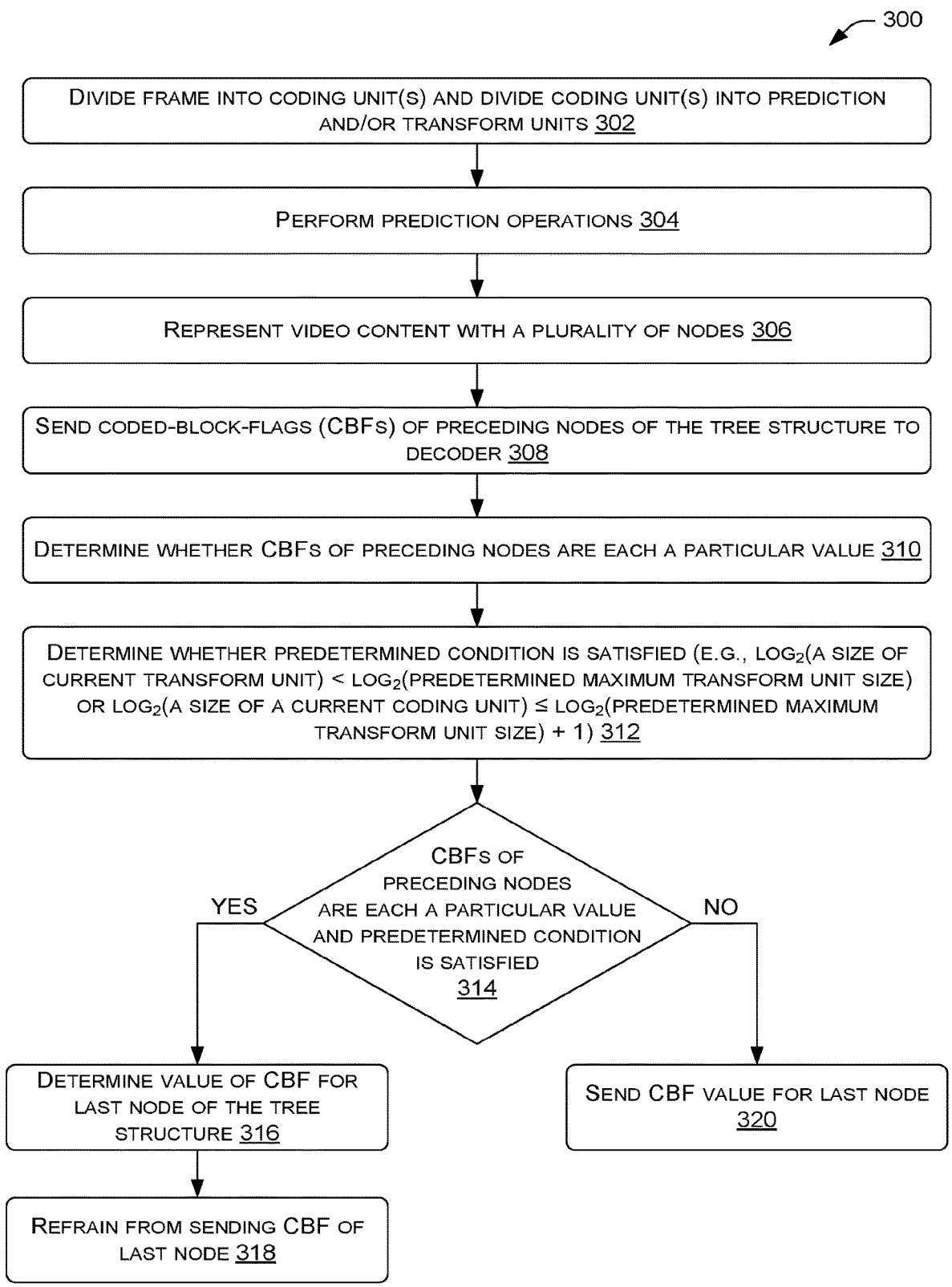
FIG. 3 illustrates an example process that may be performed by an encoder to determine a value of a coded-block-flag.
Figure 4:
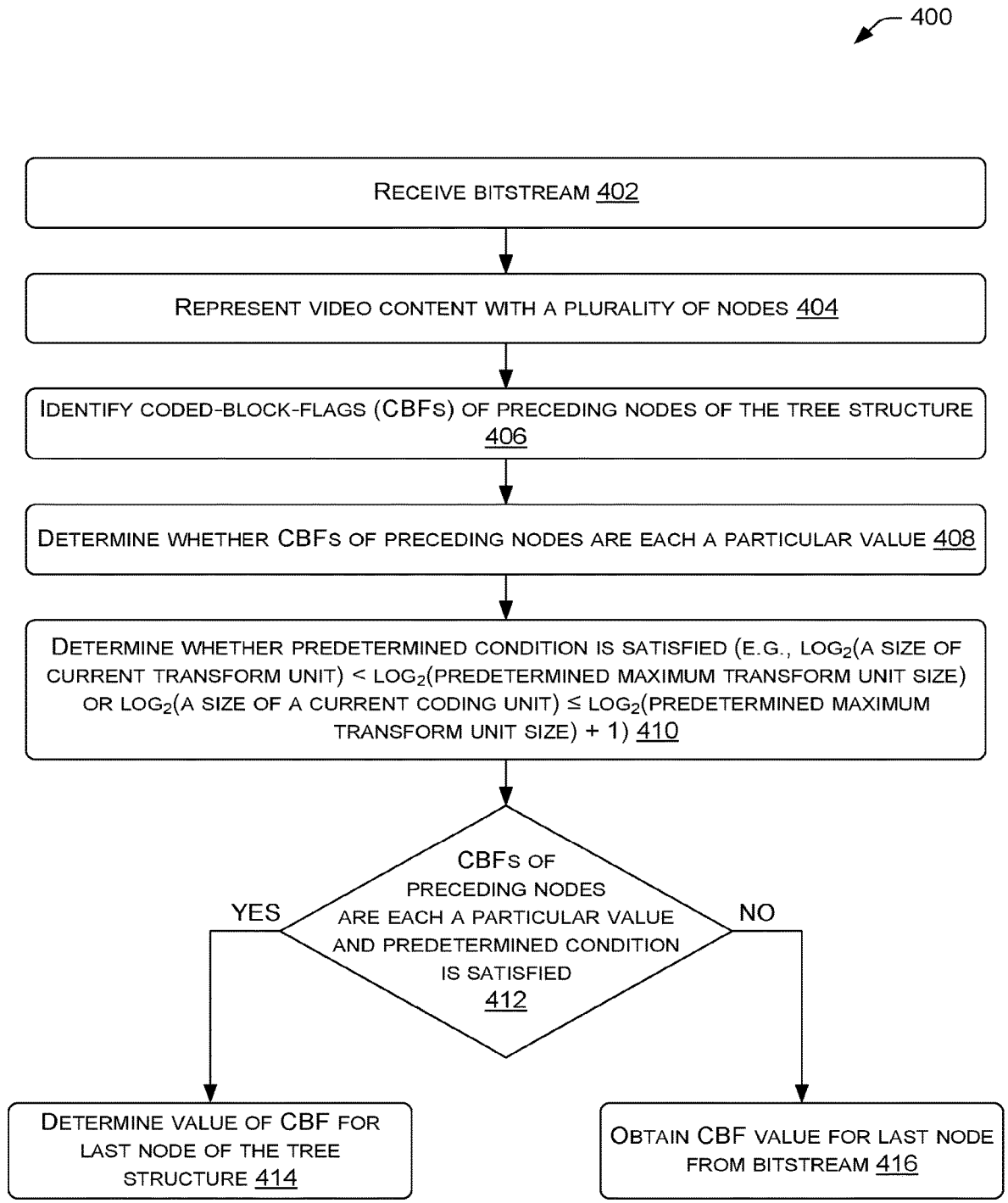
FIG. 4 illustrates an example process that may be performed by a decoder to determine a value of a coded-block-flag.

FIGS. 3-4 illustrate example processes 300 and 400 for employing the techniques described herein. For ease of illustration processes 300 and 400 are described as being performed in the architecture 100 of FIG. 1. For example, one or more of the individual operations of the processes 300 and 400 may be performed by the video content source 102 and/or the device 104. However, processes 300 and 400 may be performed in other architectures. Moreover, the architecture 100 may be used to perform other processes.

The processes 300 and 400 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 3 illustrates an example process 300 that may be performed by an encoder (e.g., the encoder 114 of FIG. 1) to determine (e.g., infer) a value of a coded-block-flag. In particular, at operation 302, the encoder may divide a frame of video content into one or more coding units of a predetermined size (e.g., 32×32 pixels). At 302, the encoder may also divide each coding unit into one or more prediction and/or transform units of one or more levels. In some instances, a prediction and/or transform unit may be split into four sub-units. Further, in some instances if a transform unit is greater than or equal to a predetermined maximum size, then the transform unit may be split.

At operation 304, the encoder may perform prediction operations on the one or more prediction units. The prediction operations may result in residual information (e.g., a difference between pixel values of a reference block and pixel values of a prediction unit). A coded-block-flag may then be associated with each prediction unit and/or a corresponding transform unit. The coded-block-flag may indicate whether the prediction unit and/or transform units includes residual information.

At operation 306, the encoder may represent the video content with a plurality of nodes. For example, a particular coding unit may be represented as a tree structure (e.g., create a residual quadtree) including nodes that correspond to transform units. Each transform unit may be associated with a coded-block-flag.

At operation 308, the encoder may send coded-block-flags of preceding nodes at a particular level in the tree structure to a decoder (e.g., store coded-block-flags in a bitstream to be sent to the decoder). For example, in a residual quadtree having four leaf nodes at a particular level, the encoder may send coded-block-flags of the first three nodes in the quadtree.

At operation 310, the encoder may determine whether the coded-block-flags of the preceding nodes are each a particular value. For example, the encoder may determine whether a coded-block-flag of a preceding node (e.g., transform unit) is a particular value indicating that the node does not include residual information (e.g., "0").

At operation 312, the encoder may determine whether a predetermined condition is satisfied. For example, the encoder may determine whether $\log_2$(a size of a current transform unit)<$\log_2$(the predetermined maximum transform unit size) and/or whether $\log_2$(a size of a current coding unit)<$\log_2$(the predetermined maximum transform unit size)+1. The current transform unit may correspond to the node that is currently being processed (e.g., the fourth/last node of a particular level).

At operation 314, if the operation 310 determines that the coded-block-flags of the preceding nodes are each a particular value and if the operation 312 determines that the predetermined condition is satisfied, then the process 300 may proceed to operation 316.

At the operation 316, the encoder may determine (e.g., infer) a value of a CBF associated with a last node of the tree structure (e.g., fourth node at a particular level). For example, the encoder may determine that the last transform unit (e.g., fourth transform unit) of a residual quadtree at a particular level includes a coded-block-flag value that indicates that the transform unit includes residual information (e.g., "1").

At operation 318, the encoder may refrain from sending the coded-block-flag of the last node to the decoder (e.g., refrain from storing the coded-block-flags in a bitstream to be sent to a decoder). However, the encoder may send the coefficients for the last node to a decoder. The coefficients may have been determined through transforming the residual information for the node (e.g., transform unit).

Alternatively, at operation 314, if the operation 310 determines that the coded-block-flags of the preceding nodes are not each a particular value and/or if the operation 312 determines that the predetermined condition is not satisfied, then the process 300 may proceed to operation 320.

At the operation 320, the encoder may send the coded-block-flag of the last node to the decoder (e.g., store coded-block-flag in a bitstream to be sent to the decoder). In addition, the encoder may send the coefficients for the last node to the decoder.

FIG. 4 illustrates an example process 400 that may be performed by a decoder (e.g., the decoder 124 of FIG. 1) to determine (e.g., infer) a value of a coded-block-flag. In particular, at operation 402, the decoder may receive a bitstream that was generated by an encoder. The bitstream may include compressed data for video content.

At operation 404, the decoder may represent the video content of the bitstream with a plurality of nodes. For example, a particular coding unit of the video content may be represented as a residual quadtree including nodes that correspond to transform units. Each transform unit may be associated with a coded-block-flag.

At operation 406, the decoder may identify coded-block-flags in the bitstream of preceding nodes at a particular level of the tree structure. At operation 408, the decoder may determine whether the coded-block-flags of the preceding nodes are each a particular value. For example, the decoder may determine whether a coded-block-flag of a preceding node (e.g., one of first three transform units on a particular level) is a particular value that indicates that the node does not include residual information (e.g., "0").

At operation 410, the decoder may determine whether a predetermined condition is satisfied. For example, the decoder may determine whether $\log_2$(a size of a current transform unit)<$\log_2$(the predetermined maximum transform unit size) and/or whether $\log_2$(a size of a current coding unit)<$\log_2$(the predetermined maximum transform unit size)+1. The current transform unit may correspond to the node that is currently being processed (e.g., the fourth/last node of a particular level).

At operation 412, if the operation 408 determines that the coded-block-flags of the preceding nodes are each a particular value and if the operation 410 determines that the predetermined condition is satisfied, then the process 400 may proceed to operation 414.

At the operation 414, the decoder may determine (e.g., infer) a value of a CBF associated with a last node of the tree structure (e.g., fourth node at a particular level). For example, the decoder may determine that the last transform unit (e.g., fourth transform unit) of a residual quadtree at a particular level includes a coded-block-flag value that indicates that the transform unit includes residual information (e.g., "1").

Alternatively, at operation 412, if the operation 408 determines that the coded-block-flags of the preceding nodes are not each a particular value and/or if the operation 410 determines that the predetermined condition is not satisfied, then the process 400 may proceed to operation 416.

At the operation 416, the decoder may obtain the coded-block-flag for the last node (e.g., fourth node) from the bitstream. That is, the decoder may know that the next bit to be read in from the bitstream corresponds to the coded-block-flag for the last node. The decoder may also obtain the coefficients for the last node, which may follow the coded-block-flag in the bitstream.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A computer system comprising one or more processing units and memory, wherein the computer system implements a video encoder configured to perform operations comprising:

encoding video content to produce compressed data, including, for a given coding unit ("CU") of the video content:
  determining that a root transform unit ("TU") of a residual quadtree for the given CU includes residual information;
  determining a value of a coded block flag ("CBF") for the root TU, the value of the CBF for the root TU indicating the root TU includes residual information;
  signaling, as part of the compressed data, the value of the CBF for the root TU;
  determining whether to split the root TU into multiple nodes, each of the multiple nodes being associated with a block, including determining that a predetermined condition is satisfied, the predetermined condition relating to a predetermined maximum TU size, wherein the determining that the predetermined condition is satisfied includes determining that $\log_2$(a TU size)<$\log_2$(the predetermined maximum TU size);
  determining values of multiple preceding CBFs for multiple blocks, the values of the multiple preceding CBFs indicating the multiple blocks, respectively, do not include residual information; and based at least in part on the values of the multiple preceding CBFs indicating the multiple blocks, respectively, do not include residual information, determining a value of a CBF for a given block, the value of the CBF for the given block indicating that the given block includes residual information, and refraining from signaling, as part of the compressed data, the value of the CBF for the given block; and outputting the compressed data as part of a bitstream, wherein the compressed data includes the value of the CBF for the root TU but not the value of the CBF for the given block, the value of the CBF for the root TU being signaled for the given CU.

2. The computer system of claim 1, wherein the given CU is encoded using inter-prediction.

3. The computer system of claim 1, wherein the compressed data includes a tree structure for the residual quadtree, the tree structure including:
- one or more values of split flags for TUs of the residual quadtree;
- zero or more values of CBFs for the TUs of the residual quadtree; and
- for each un-split TU of the residual quadtree that includes residual information, residual information for that un-split TU of the residual quadtree.

4. The computer system of claim 1, wherein, within the bitstream, any values of CBFs for the multiple nodes are signaled in a tree structure for the residual quadtree.

5. The computer system of claim 1, wherein the multiple blocks and the given block are on a same level of the residual quadtree.

6. The computer system of claim 1, wherein the encoding the video content further includes, for the given CU:
- performing prediction operations to produce predicted values for the given CU; and
- based on differences between pixel values for the given CU and the predicted values, generating the residual information for the given CU.

7. The computer system of claim 1, wherein the given block is for a luma component.

8. One or more non-transitory computer-readable media having stored thereon compressed data as part of a bitstream, the compressed data including a value of a coded block flag ("CBF") for a root transform unit ("TU") of a residual quadtree for a given coding unit ("CU") of video content, the value of the CBF for the root TU being signaled for the given CU, and wherein the compressed data is produced by encoding the video content with operations that include, for the given CU:
- determining that the root TU of the residual quadtree for the given CU includes residual information;
- determining the value of the CBF for the root TU, the value of the CBF for the root TU indicating the root TU includes residual information;
- signaling, as part of the compressed data, the value of the CBF for the root TU;
- determining whether to split the root TU into multiple nodes, each of the multiple nodes being associated with a block, including determining that a predetermined condition is satisfied, the predetermined condition relating to a predetermined maximum TU size, wherein the determining that the predetermined condition is satisfied includes determining that $\log_2$(a TU size)<$\log_2$(the predetermined maximum TU size);
- determining values of multiple preceding CBFs for multiple blocks, the values of the multiple preceding CBFs indicating the multiple blocks, respectively, do not include residual information; and
- based at least in part on the values of the multiple preceding CBFs indicating the multiple blocks, respectively, do not include residual information, determining a value of a CBF for a given block, the value of the CBF for the given block indicating that the given block includes residual information, and refraining from signaling, as part of the compressed data, the value of the CBF for the given block.

9. The one or more computer-readable media of claim 8, wherein the given CU is encoded using inter-prediction.

10. The one or more computer-readable media of claim 8, wherein the compressed data includes a tree structure for the residual quadtree, the tree structure including:
- one or more values of split flags for TUs of the residual quadtree;
- zero or more values of CBFs for the TUs of the residual quadtree; and
- for each un-split TU of the residual quadtree that includes residual information, residual information for that un-split TU of the residual quadtree.

11. The one or more computer-readable media of claim 8, wherein, within the bitstream, any values of CBFs for the multiple nodes are signaled in a tree structure for the residual quadtree.

12. The one or more computer-readable media of claim 8, wherein the multiple blocks and the given block are on a same level of the residual quadtree.

13. The one or more computer-readable media of claim 8, wherein the operations further include, for the given CU:
- performing prediction operations to produce predicted values for the given CU; and
- based on differences between pixel values for the given CU and the predicted values, generating the residual information for the given CU.

14. In a computer system that implements a video decoder, a method comprising:
- receiving compressed data as part of a bitstream; and
- decoding the compressed data to reconstruct video content, including, for a given coding unit ("CU") of the video content:
  - determining a value of a coded block flag ("CBF") for a root transform unit ("TU") of a residual quadtree for the given CU, the value of the CBF for the root TU indicating the root TU includes residual information, wherein the compressed data includes the value of the CBF for the root TU, the value of the CBF for the root TU being signaled for the given CU;
  - determining, based on the value of the CBF for the root TU, that the root TU includes residual information;
  - determining whether the root TU is split into multiple nodes, each of the multiple nodes being associated with a block, including determining that a predetermined condition is satisfied, the predetermined condition relating to a predetermined maximum TU size, wherein the determining that the predetermined condition is satisfied includes determining that $\log_2$(a TU size)<$\log_2$(the predetermined maximum TU size);
  - determining values of multiple preceding CBFs for multiple blocks, the values of the multiple preceding CBFs indicating the multiple blocks, respectively, do not include residual information; and
  - based at least in part on the values of the multiple preceding CBFs indicating the multiple blocks, respectively, do not include residual information, determining a value of a CBF for a given block, the value of the CBF for the given block indicating that the given block includes residual information, wherein the compressed data does not include the value of the CBF for the given block.

15. The method of claim 14, wherein the given CU is decoded using inter-prediction.

16. The method of claim 14, wherein the compressed data includes a tree structure for the residual quadtree, the tree structure including:
   one or more values of split flags for TUs of the residual quadtree;
   zero or more values of CBFs for the TUs of the residual quadtree; and
   for each un-split TU of the residual quadtree that includes residual information, residual information for that un-split TU of the residual quadtree.

17. The method of claim 14, wherein the multiple blocks and the given block are on a same level of the residual quadtree.

18. The method of claim 14, further comprising, for the given CU:
   performing prediction operations to produce predicted values for the given CU; and
   combining the predicted values and the residual information for the given CU to reconstruct pixel values for the given CU.

19. The method of claim 14, wherein, within the bitstream, any values of CBFs for the multiple nodes are signaled in a tree structure for the residual quadtree.

20. The method of claim 14, wherein the given block is for a luma component.

\* \* \* \* \*